United States Patent [19]

McNatt

[11] Patent Number: 4,721,061

[45] Date of Patent: Jan. 26, 1988

[54] APPARATUS FOR GRAZING MANAGEMENT AND PASTURE IRRIGATION

[76] Inventor: Monteine McNatt, P.O. Box 396, Alamogordo, N. Mex. 88310

[21] Appl. No.: 776,665

[22] Filed: Sep. 16, 1985

[51] Int. Cl.[4] .......................... A01K 3/00; B05B 3/18
[52] U.S. Cl. ...................................... 119/20; 239/728
[58] Field of Search .................. 119/20, 21; 239/177.1

[56] References Cited

U.S. PATENT DOCUMENTS

| | | | |
|---|---|---|---|
| 2,893,643 | 7/1959 | Gordon | 239/177.1 |
| 3,302,616 | 2/1967 | Bradshaw | 119/21 |
| 3,343,521 | 9/1967 | Moores | 119/20 |
| 3,598,142 | 8/1971 | Neier | 137/344 |
| 3,599,664 | 8/1971 | Hotchkiss et al. | 137/344 |
| 3,805,741 | 4/1974 | Thompson et al. | 119/20 |
| 3,908,599 | 9/1975 | Flocchini | 119/20 |
| 3,916,942 | 11/1975 | Townsend | 137/344 |
| 3,972,307 | 8/1976 | Marseillan | 119/20 |
| 4,006,714 | 2/1977 | Goossen | 119/20 |
| 4,275,685 | 6/1981 | Hopkins | 119/20 |
| 4,341,181 | 7/1982 | Fair | 119/20 |
| 4,397,421 | 8/1983 | Schram | 239/177.1 |

FOREIGN PATENT DOCUMENTS 619153  6/1978  U.S.S.R. .............................. 119/29

Primary Examiner—Robert P. Swiatek
Assistant Examiner—Hugh R. Chamblee
Attorney, Agent, or Firm—Saidman, Sterne, Kessler & Goldstein

[57] ABSTRACT

An improved apparatus for controlling pasturage and irrigation of a field. A labyrinthine path for animals is defined in the pasture and a movable radially-extending arm carrying an electric fence causes the animals to traverse the labyrinthine path at a very slow rate, e.g. once every two weeks. The arm comprises structure for irrigating the pasture by a gentle drip feed method whereby efficiency in use of both water and land is obtained. The apparatus is disclosed in a very efficient arrangement.

27 Claims, 12 Drawing Figures

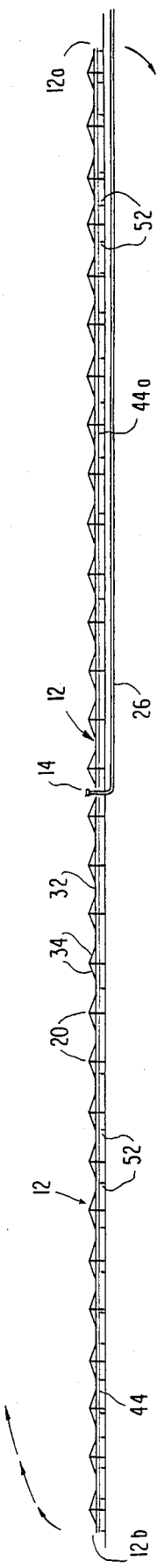
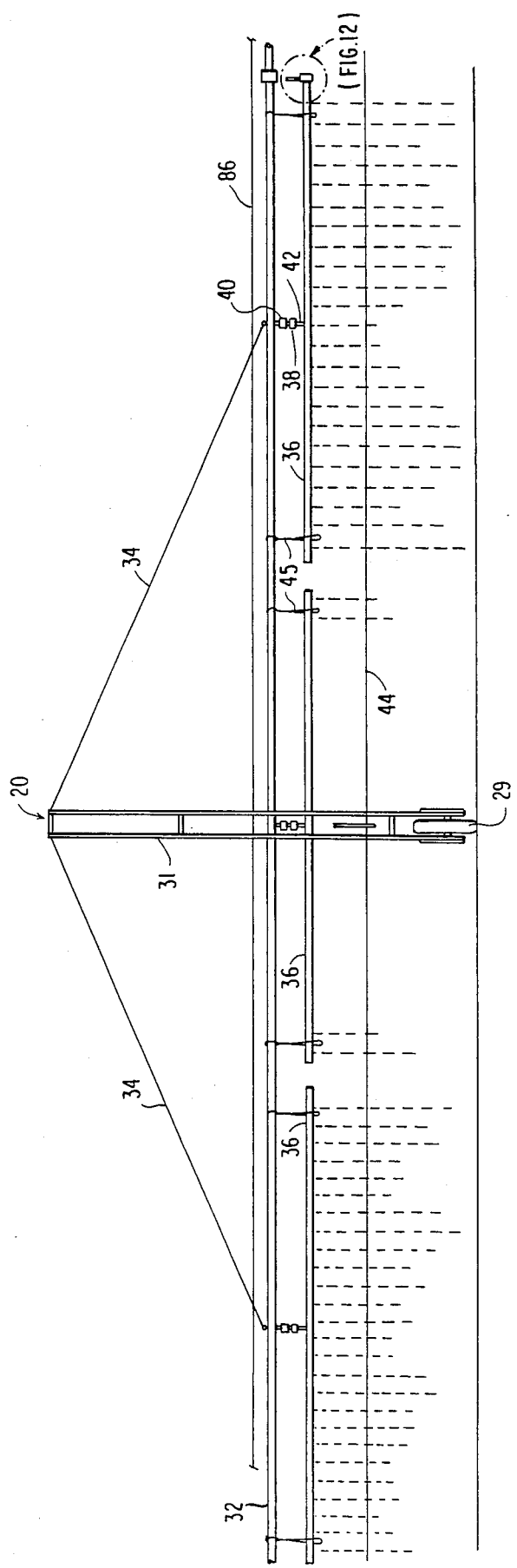
FIG. 3
FIG. 4

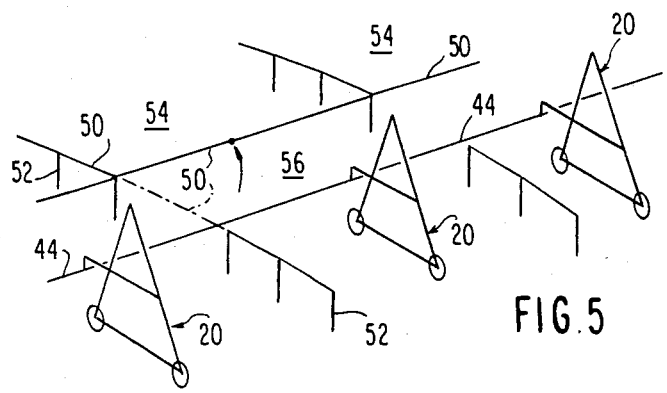
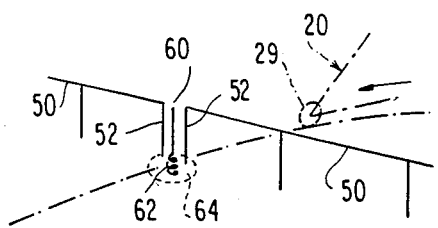
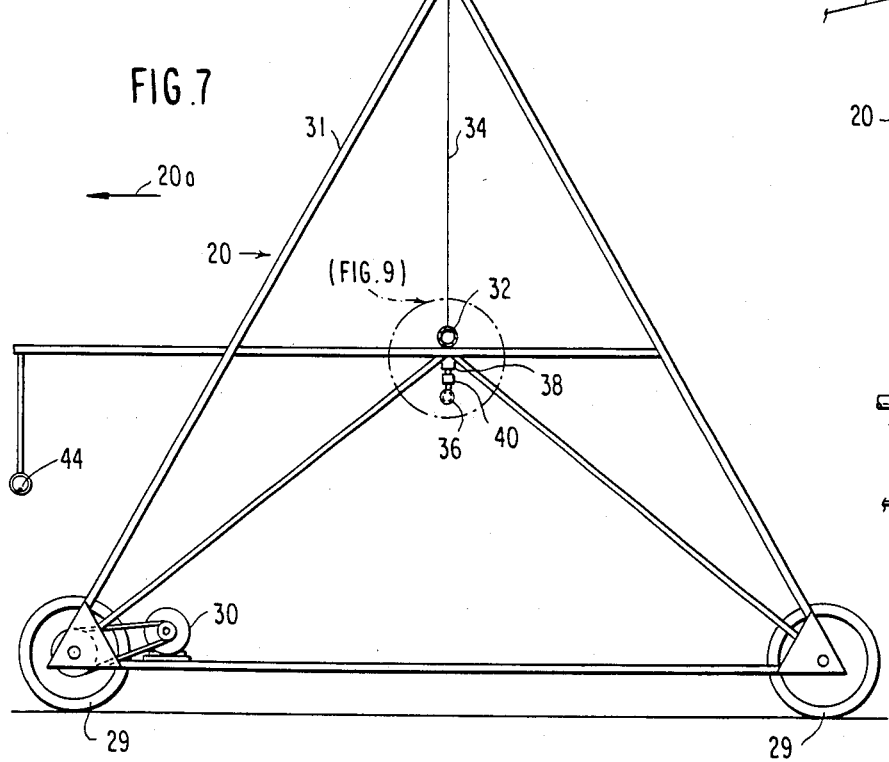
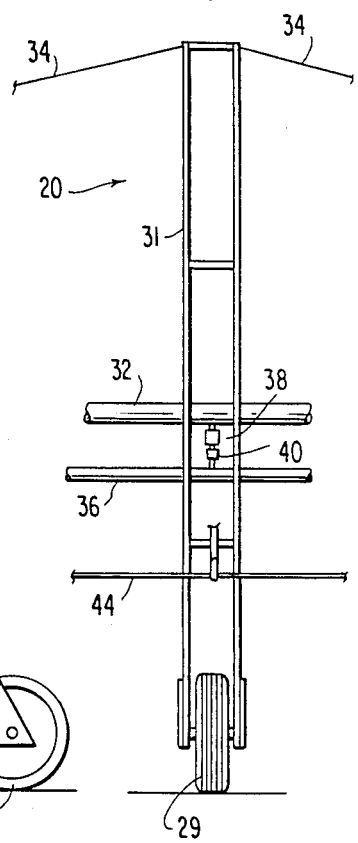
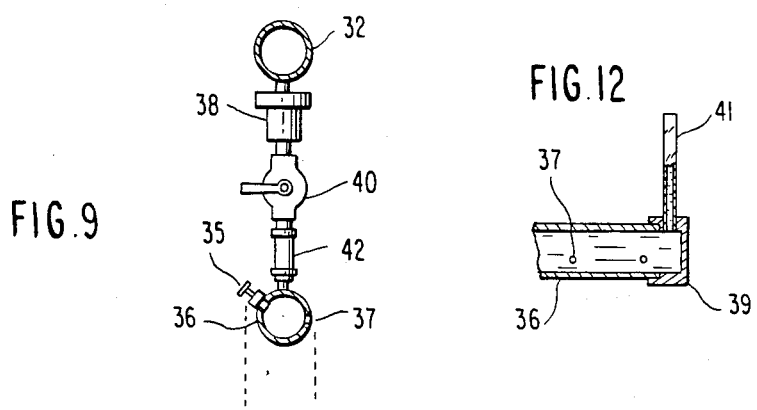

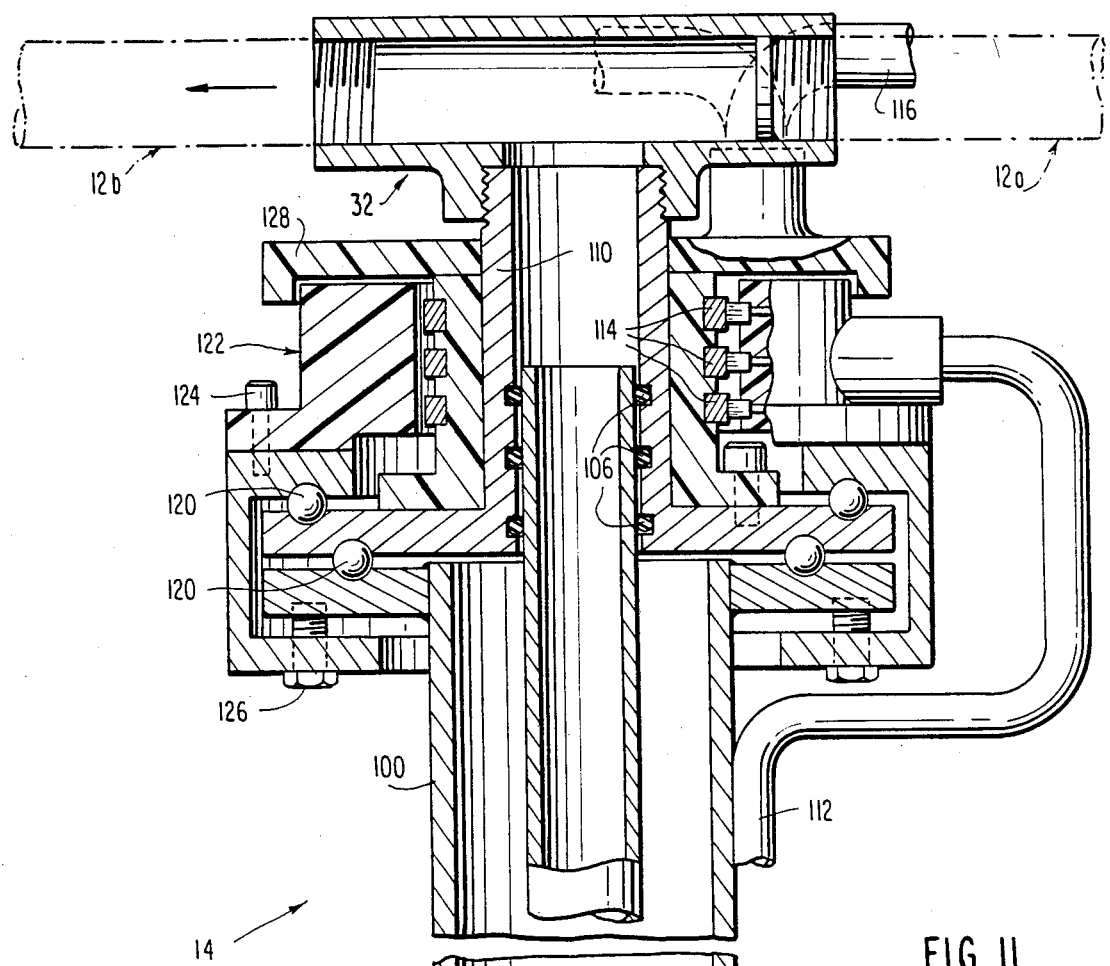
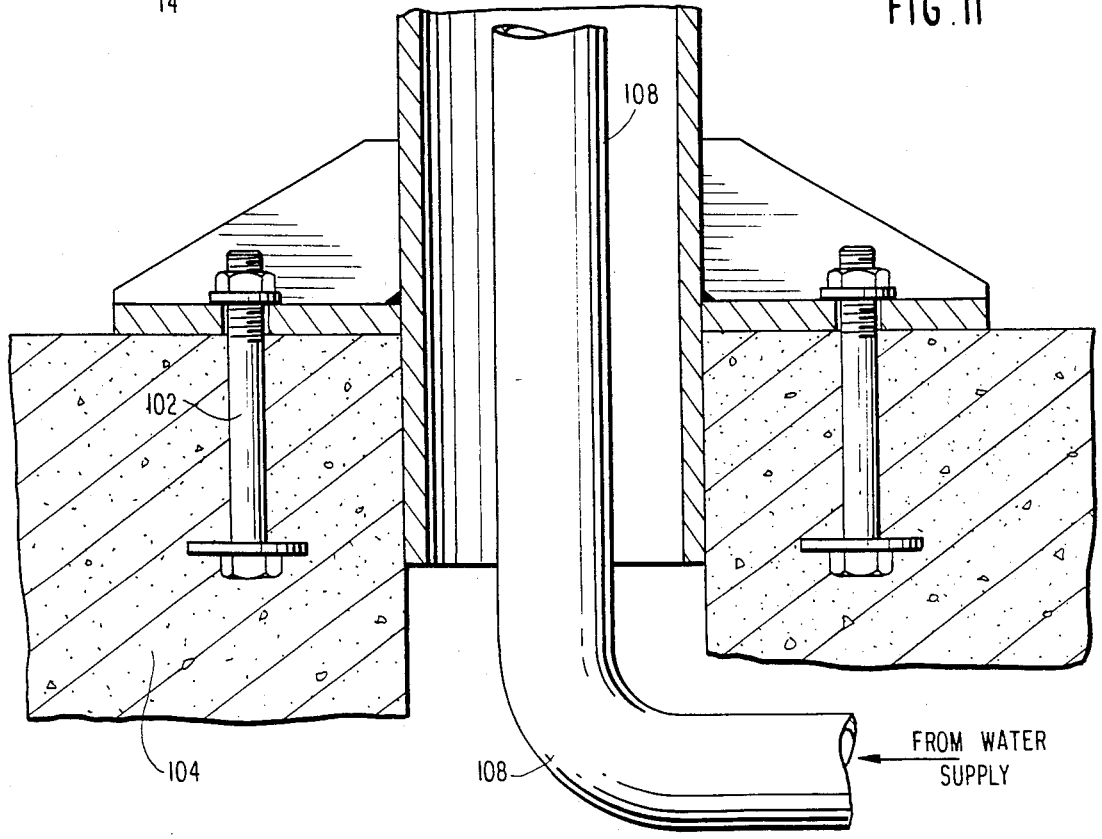
FIG. 11

APPARATUS FOR GRAZING MANAGEMENT AND PASTURE IRRIGATION

FIELD OF THE INVENTION

This invention relates to apparatus and methods for controlling the movements of a herd in a pasture, while also irrigating the pasture properly. More particularly, the invention relates to a device for irrigating a crop or pasture by a drip or trickle method which is more efficient in its use of water than previous irrigation methods known to the inventor, while simultaneously causing the animals of the herd to move controllably about the pasture so that it is evenly grazed. The end result is more efficient use of land, water, and energy.

BACKGROUND AND OBJECTS OF THE INVENTION

As is well-known, in recent years irrigation of meadows, pastures and other fields using self-propelled irrigators, which typically comprise a long radial arm rotating about a center post on a plurality of wheels has become common, particularly in the flatter parts of the United States. Most of the irrigators of which the present inventor are aware are designed to be operated using heavy watering for a period of some hours moving fairly fast around a field, sometimes making four or more revolutions per 24 hour period. After this heavy watering is completed, the irrigator may not be used again for a period of a week or more. Heavy watering requires extremely high water pressures and delivery rates. Typically, high pressures are used to spray the irrigation water far from the pipe carrying the water from the central post to the various regions of the field. Use of high water pressures requires that the piping and accompanying irrigator structure must be very heavily constructed normally 10 to 15 feet above the ground, and hence expensive to build and to operate. Furthermore, spraying of the water under high pressures, as in the prior art, means that the water is very finely dispersed in the air, whence it is very much more subject to evaporation, especially in the hot dry climate of the Southwest, than if it were more gently dispersed, e.g. in the form of droplets or trickles falling from a pipe nearer the ground.

Accordingly, it is an object of the invention to provide a moving irrigator system in which the water is not sprayed in the air, but instead is dripped or trickled gently onto the earth from a slowly moving radial arm, so as to reduce losses due to evaporation in the air and therefore to require smaller volumes of water for irrigation.

It is also an object of the invention to provide an irrigator which will disperse an amount of water on to the ground comparable to the prior art practices, but which will move the arm at a slower pace, continuously or near continuously. In this way, a very light irrigation is provided regularly, for example, daily. This will provide adequate moisture for the crop being grown, and will not have the disadvantages that the crop will become too dry before irrigation is begun again, as is typically the case with present irrigators.

Thus, by dispersing controlled amounts of water from the arm to the ground, each individual square foot of land receives an equal amount of water as the radial arm passes around the field.

Those skilled in the art of raising animals for market, particularly beef cattle, will realize that the tendency of the animals is to concentrate in one part of a pasture until the food supply in that area has been totally consumed, or the plants have been destroyed by the animals laying on them. Frequently, the animals will eat so heavily that the plants themselves will be destroyed. Therefore, even if they then move onto another area of the pasture, the area where they have been will not recover adequately; and their tendency is to return to the area and consume whatever new growth there is, further damaging the plant life. The prior art has addressed this problem by dividing pastures into a number of different, smaller areas and driving the animals from one to another from time to time. However, even this is not as efficient as would be desirable, because there will always tend to be some parts of each individual portion of the pasture where the animals will tend to confine their heaviest grazing, make trails, lay down repeatedly, and establish manure areas. Accordingly, the prior art has recognized the utility of providing a movable fence which can be used, in effect, to define a movable pasture. See, for example, U.S. Pat. No. 4,341,181 to Fair, which shows a corral which follows a track. However, the device shown in the Fair patent requires that an operator lay out a track for its movement, which is inefficient of manpower. The art requires an automatic apparatus defining a pasture which keeps the animals moving in a prescribed pattern which will ensure relatively even grazing, which does not require an operator to be present, and which will provide an undisturbed regrowth period before an area is again grazed.

It is accordingly an object of the invention to provide an apparatus for ensuring that cattle graze a pasture uniformly and substantially continuously such that maximum utilization is made of the pasture, which does not require an operator's continued or frequent presence, and which provides a regrowth period without animal traffic.

Provision of uniform grazing according to the invention also solves another problem recognized by the prior art, that of disposition of manure. Uniform grazing ensures that the disposition of manure over a field is substantially even. By the time the animals return to a particular area of the pasture enough time will have passed that the manure will have substantially decomposed and become useful fertilizer as well, a further aid in obtaining maximum productivity from the land.

As mentioned above, prior art automatic irrigation systems have tended to be constructed very heavily due to the large amounts of water at relatively high pressures which they must disperse.

It is an object of the present invention to provide an automatic irrigation system which is not required to disperse high volumes of water at high pressure and which can, therefore, be built inexpensively and utilized at low cost.

It is a further object of the invention to combine such an irrigation system with a system for automatic management of the movement of a herd through a pasture, as described above, such that maximum economy can be realized simultaneously with maximum efficiency of use of energy, water, and land.

It is therefore the ultimate object of the invention to provide a combination herd management and irrigation apparatus which will be simple and relatively inexpensive to construct, which will be durable in operation, which will cause a herd of grazing cattle to move progressively through a defined path in a pasture so that the same areas of the pasture are not revisited before the plant life has had time to regrow, and wherein irrigation is performed in the most efficient possible manner, all so as to ensure maximum efficiency of use of energy, of water, and of land. Desirably, the apparatus should permit either function, irrigation and livestock herding, to be performed without the other.

SUMMARY OF THE INVENTION

The invention satisfies the needs of the art and objects of the invention mentioned above by its provision of a radially-moving arm rotating about a post in the center of a generally spiral-like pathway laid out in a pasture using electrically energized wire. The arm comprises means for dripping water onto the pasture beneath, and one-half of the arm comprises means for urging the cattle slowly (e.g., once per day) around the spiral, such as an energized wire or the like. In effect, therefore, the cattle are driven gradually around the spiral, either from the inside out or from the outside in. The arm is essentially a moving-irrigating fence. When the spiral is laid out to provide fourteen concentric lanes, such that over a period of on the order of two weeks, the cattle will visit every area of the spiral, the pasture will have been irrigated 14 times. At the end of the period, the fencing of the spiral is rearranged to provide a direct passageway from the inside out or from the outside in, as required. The cattle are driven by an operator through the passageway, and the automatic process is begun again.

Preferably, the radial arm is constructed and positioned to extend across the spiral. One half of the arm irrigates the pasture, and the other prevents the animals from walking on the wet ground. Thus, the cattle are kept several hours behind the irrigator arm, since it is very detrimental to pasture, crops, and soil to have animal traffic on wet ground. The arm keeps the cattle at least 180 degrees away from the irrigator allowing the maximum of soak-in time and drying before the animals graze it. Thus, the irrigator half of the arm follows, urging them forward, and the other half of the arm holds them back. More then one non-irrigating arm could be utilized for managing different kinds of livestock, for example, to separate sheep, horses and cattle.

In the preferred embodiment, the irrigation half of the device comprises a number of pipes, operated as drip trays, in which water pressure is carefully regulated such that water simply drips or trickles out of controlled-size orifices onto the meadow below to provide light, even irrigation as the arm moves. In this way, high evaporation losses due to fine atomization of the water caused by spraying of the water into the air are avoided in favor of dripping of relatively cohesive drops of water, which penetrate the earth with much higher efficiency than if atomized. The device of the invention additionally comprises means for ensuring that the main arm stays straight as it slowly traverses the pasture, and means for automatically terminating its movement if it should kink or bend.

BRIEF DESCRIPTION OF THE DRAWINGS

The invention will be better understood if reference is made to the accompanying drawings in which:

FIG. 3 shows a side view of the system of the invention;

FIG. 4 shows an enlarged side view comparable to FIG. 3 showing one section of the system of the invention;

FIG. 5 shows the manner in which the labyrinthine path laid out to direct the cattle through the pasture can be rearranged to provide an exit;

FIG. 6 shows the manner in which the wheels upon which the irrigation and herd control system of the invention ride pass through the electrical wire defining the labyrinthine path;

FIG. 7 shows a side view of one of the towers of the assembly;

FIG. 8 shows an end view of one of the towers of FIG. 7;

FIG. 9 is an enlarged view of a portion of FIG. 7, detailing the piping connections of the system of the invention;

FIG. 11 shows a cross-sectional view of the center post of the system of the invention, showing how electrical and plumbing connections are made thereto; and FIG. 12 shows a detail of the end of the drip trays used according to the invention.

DESCRIPTION OF THE PREFERRED EMBODIMENT

Figure 1:
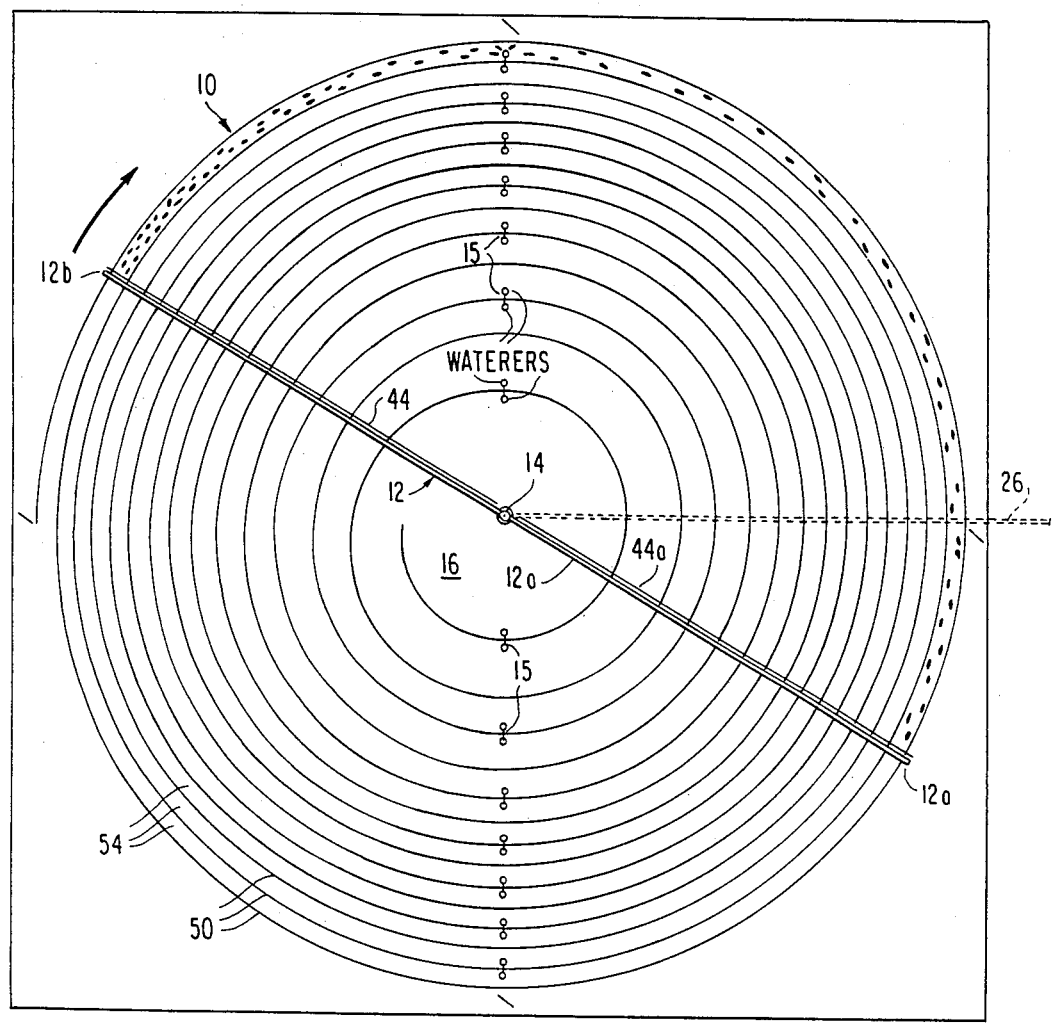
FIG. 1 shows, in effect, an aerial view of the system of the invention.

As discussed above, one of the primary objects of the present invention is to ensure that a pasture is evenly irrigated and evenly grazed by a herd of animals. In the preferred embodiment of the present invention, a labyrinthine path, basically spiral in shape (although other sorts of paths are within the scope of the invention as will be discussed below), is laid out in a pasture. The spiral shape is shown in FIG. 1 at 10. It will be appreciated by those skilled in the art that what is shown is not a true spiral in that it in fact comprises a number of concentric circles, one portion of which, roughly the portion from the nine to ten o'clock positions on FIG. 1, comprises transition sections. It would be desirable to have a perfect spiral, of course, but this would be very difficult to lay out, and there would be difficulties in arranging passage of the wheels on which the irrigator/herding device is supported through the fence defining the spiral as well. Each circular portion of the labyrinthine path is of equal area. The other main component of the invention is the rolling irrigator/herding device 12, referred to hereinafter as the "radial arm". This entire structure rotates about a center post 14 which is detailed below in connection with FIG. 11. One-half 12b of the radial arm 12 comprises means for dripping or trickling water onto the pasture beneath it and for gently driving the cattle forwardly around the spiral, e.g. in the direction of the arrow. The other half 12a of the radial arm 12 prevents the cattle from trafficking on the wet ground. Accordingly, as the radial arm 12 rotates, the cattle of the herd (shown as small, oval dots) move through the spiral, eventually terminating in the center section 16. Water is supplied by an underground pipe 26. The radial arm carries electrified wire 44, 44a for controlling the movement of the cattle.

It will be readily seen that the present invention can be utilized using a radial arm extending outwardly from the center post 14 in only one direction for both irrigating and control of animal movement. Best performance is accomplished, however, by the use of a radial arm 12 which extends across the spiral, as illustrated, so that one portion 12a holds the cattle behind the irrigator portion 12b for several hours to allow maximum drying before the cattle traffic and graze the recently irrigated area. Both soil and plants are damaged much less by traffic and grazing when there is less moisture in the soil.

Assuming a 24 hour rotation cycle is used, portion 12b of the radial arm 12 will be watering 12 hours ahead of the foremost animal of the moving herd behind the holding portion 12a opposite the irrigating arm 12b. Without the holding portion 12a, some livestock would follow immediately behind the irrigating arm 12b on the wet soil.

As mentioned above, it is desired that the pasture be evenly grazed. Because the outer rings of the spiral are longer per rotation than the inner rings, they are made narrower as shown so that all of the rings are of approximately equal square footage. The rate of rotation of the radial arm 12 is usually maintained constant. Alternatively, the radial arm 12 could be moved somewhat faster as the cattle move towards the inside of a spiral having equally spaced concentric rings. In either event, the goal is to ensure even grazing by the cattle. For similar reasons, where the foliage is more or less thick, the rotation rate for the radial arm 12 could be changed accordingly, in a manner discussed below. However, it is believed that use of the apparatus of the invention will cause the foliage of the pasture to grow quite uniformly.

It is believed that since the use of the apparatus of the invention will cause the foliage of the pasture to grow quite uniformly, and to be grazed uniformly, the number of cattle which can be satisfactorily handled and fed preparatory for marketing, will substantially increase over the number which are presently fed using conventional pasturing methods. Increased market weights and number of cattle marketed combine to result in higher profits per acre.

Livestock water is made available to the livestock inside each spiral pathway by installing small float controlled watering devices 15. Preferably, pairs of waterers 15 share a common water supply pipe to provide water to two spiral pathways from a single riser. A single supply pipe coming out of the ground immediately under the fence defining the spiral, a "tee" fitting and two watering devices on either side of the fence will supply water to two spiral pathways. The animals will drink one or more times each day as they pass the waterers. Thus, at least two waterings per day are available to the animals.

As an alternative, a number of watering troughs equal to the number of lanes in the spiral may be mounted on wheels and towed behind portion 12a of the radial arm. In this way the tendency of the animals to congregate around the waterers 15, which is very damaging to the plant life, is avoided. The troughs may be kept filled by float regulators.

Figure 2:
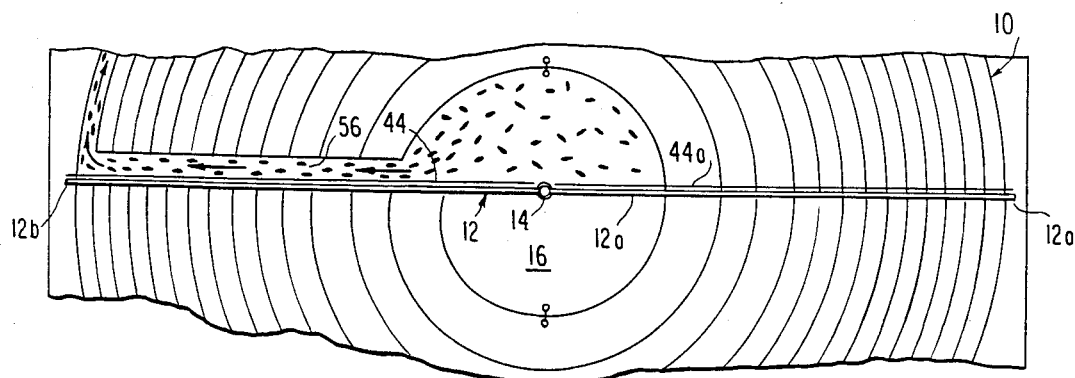
FIG. 2 shows a view comparable to a portion of FIG. 1 showing the arrangement provided for exiting the herd from the center of the pasture.

As mentioned above, eventually the cattle will assemble in the central area 16 of the spiral. FIG. 2 shows how a portion of the fence defining the spiral can be conveniently and temporarily rearranged to provide a path for the herd to reach to reach the outside of the spiral. The applicant has experimented successfully with constructing fences by inserting pieces of the rod used in reinforced steel concrete construction (rebar) into the ground and stringing electrical wire on insulators on the rebar, to provide electric fencing. The radial arm 12 is used to form one side of a pathway and the wires are rearranged to form the other, as shown generally in FIG. 2, thus providing an exit pathway for the cattle when they have reached the center 16 of the spiral 10.

FIG. 3 shows an overall side view of the radial arm 12. It is made up of a number of towers 20 which support guy wires 34 which support a main water pipe 32 which extends from one end of the radial arm 12 at least to the center post 14. In the preferred embodiment, the pipe 32 extends past the center post 14 to the other end of the radial arm 12. The structure will be further detailed in connection with additional drawings below. The radial arm 12 rotates as mentioned above about a central post 14, detailed below in connection with FIG. 11, which supplies electrical power for the motors which drive the radial arm 12 and is the central source of water supply as well. The cables and pipes 26 required for connection to the center post 14 are buried underground, as shown.

FIGS. 4, 7 and 8 detail the tower structure. As shown, each tower 20 is a generally triangular structure, formed of two spaced triangular members, having wheels 29 at two of the apexes of the triangle. One of the wheels on each tower is driven by a motor 30. Connecting the towers 20 is the main water supply pipe 32. On the half 12a of the radial arm 12 which is used essentially as a fence, the same structure may be used; the pipe 32 in this portion is not filled with water. The water supply pipe 32 is supported between the towers 20 by guy wires 34. From the water pipe 32 on the irrigator portion 12b of the radial arm 12 are hung a number of drip trays 36 which each comprise another section of water pipe having holes 37 (see FIGS. 9 and 12) drilled therein for dripping of water onto plants. Wire loops 45 keep the drip trays 36 aligned with the water pipe 32, while the drip trays are permitted to self-level as necessary. As detailed in FIG. 9, the main water pipe 32 is connected to each of the drip trays 36 by way of an in-line filter and regulator 38, a valve 40 and typically a section of rubber hose 42 to allow some flexibility therebetween. The drip trays 36 may be fitted with needle valves 35 or the equivalent if more precise flow control than provided by drilled holes 37 is required. Also carried on the triangular tower structure is an electrified wire 44 (FIGS. 4, 8) which ensures that the herd keeps moving ahead of the tower structure.

Leveling of the trays 36 is accomplished by the weight of the water within each tray 36. Water flow is regulated from the main water supply pipe 32 so that the drip-trickle trays 36 are slightly overfilled, so that the water level of the full trays accomplishes the self-leveling. FIG. 12 shows how the end of each tray is capped at 39 and provided with a small diameter open-ended tube 41 extending upwardly. In this way all air within the tray is permitted to escape, so that the trays 36 remain slightly over-filled with water at all times. The degree of over-filling of each tray 36 is adjusted by the regulator 38 and the valve 40 to accomplish self-leveling and to produce the desired water pressure at the holes 37 and/or needle valves 35, if used. By controlling the height of the water column in the tubes 41 (which are desirably transparent), the amount of water which drips or trickles through the holes 37 in the trays 36 can be quite accurately and constantly controlled. It will be noted that very exacting control is necessary to evenly cover the ground with water. Flow rates in a typical embodiment of the invention vary along the irrigator portion 12b of radial arm 12 between 7 and 168 ounces of water per minute.

The looped guide wires 45 extending downwardly from the main water supply pipe 32 are not firmly attached to the trays 36, but surround one or both of the ends of each tray 36 to keep the tray 36 from swiveling out of line, and to keep the end of the tray 36 from touching the ground when the device of the invention is not being used for irrigation.

FIG. 5 shows how the spiral may be arranged and how it may be modified to provide an exit path for the herd when it has reached the center area 16 of the spiral. The spiral is defined by an electrically conductive wire 50, which is connected to a source of electrical potential (not shown) to induce an electric shock in any animals of the herd which brush the wire. The wire 50 is supported by a number of posts 52 which, as mentioned above, may conveniently be formed of concrete reinforcing rod, on which the electrical wire 50 is supported by insulators.

Typically, in a 40-acre field, the width of the pathway 54 defined by the electrically charged wire 50 varies from approximately 24 feet at the outermost ring of the spiral to approximately 176 feet on the innermost ring of the spiral. Also typically in a 40-acre field, each ring of the spiral contains approximately 97,699 square feet, which is 1/14 of the total area. Thus, if the radial arm is adjusted to travel one revolution per day, the cattle will graze approximately 97,699 square feet each day, leaving 1,270,085 square feet of the pasture undisturbed each day.

When it is desired that the herd be driven from the center of the spiral 16 to the outside to begin the process again, the arrangement shown in FIG. 5 is provided. According to this aspect of the invention, the electric fence 44 carried by the towers 20 forms one side of an exit lane 56 and that portion of the fence 50 which is shown in dotted lines (and ordinarily defines part of the lane 54) will be moved to define the other side of the exit lane 56, as shown by the arrow. The herd is then driven from the inside of the spiral to the outside, the wire 50 replaced, and the process may begin again. As mentioned, for a pasture one-quarter mile on a side, the applicant envisions that the rate of rotation of the radial arm 12 would be about one revolution per day, and the number of lanes would be about 14, such that the process of moving the herd from the outside to the inside would be completed in about two weeks.

Those skilled in the art will recognize that at some point the wheels 29 of the towers 20 must cross the wires 50 defining the spiral lanes 54. There are a number of ways in which this could be accomplished, of course. The solution presently chosen by the applicant is shown in FIG. 6. This involves the mounting of a post 60 on a spring 62 firmly mounted in the ground. The post 60 fills a gap between two adjoining ones of the rebar posts 52 supporting the electrically charged wire 50. Electrical continuity between the two portions of the wire 50 is maintained by insulated wire connecting posts 52 and buried in the ground as shown at 64. The gap between the two uprights 52 is 8-10 inches, a space wide enough for the wheel to pass through handily, but not wide enough to allow the animals of the herd to pass through without shocking themselves. Accordingly, when one of the towers 20 shown in phantom approaches the sprung upright 60, its wheel 29 simply deflects the upright 60 and lets the tower pass through the electrified fence 50 defining the lane 54.

Figure 10:
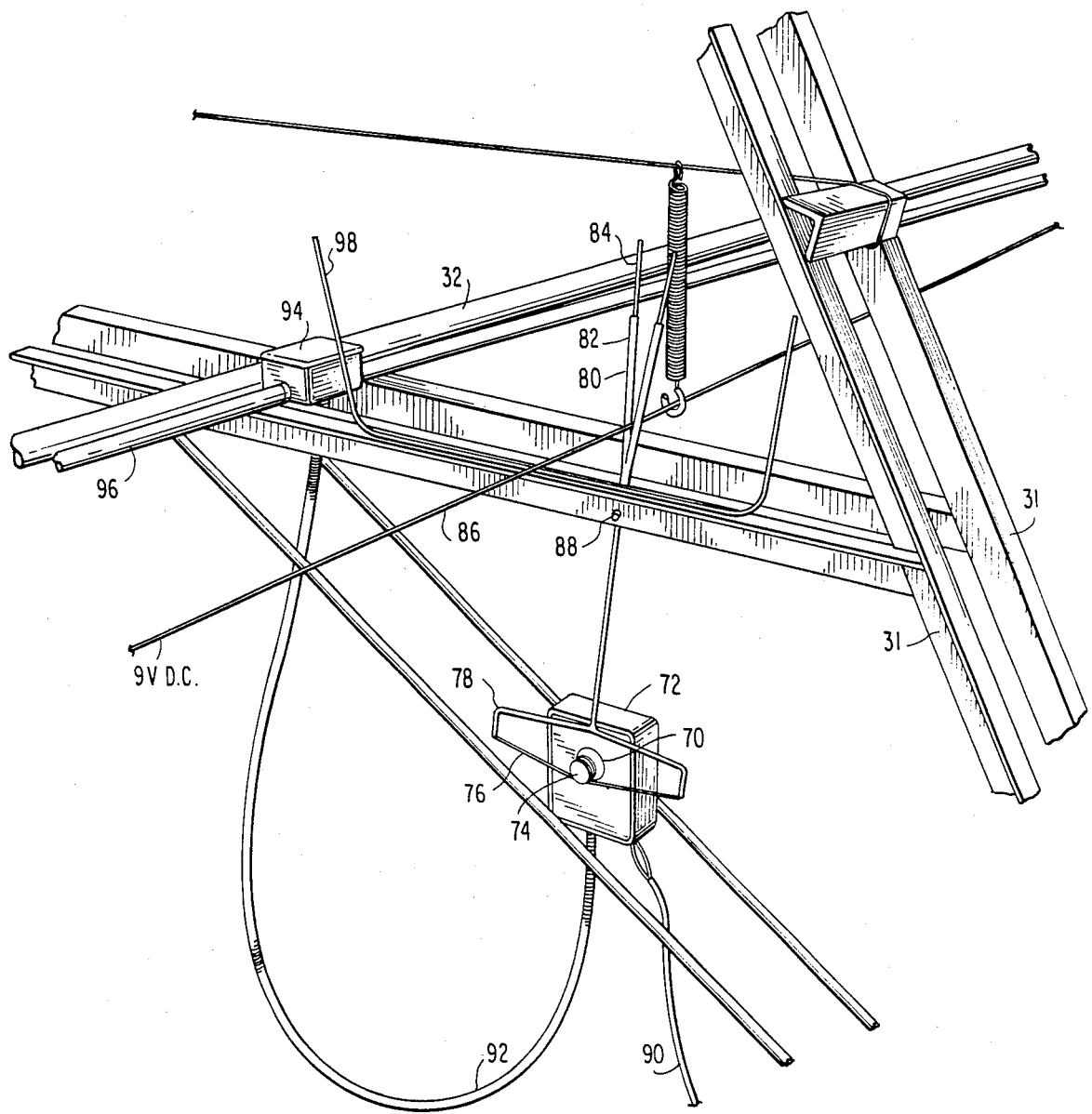
FIG. 10 shows the electrical control system used to control the motion of each of the towers.

As shown in FIG. 8, and as more clearly visible in FIG. 10, each of the towers 20 comprises two spaced triangular members 31, which in a typical embodiment may be formed of $1\frac{1}{2} \times 1\frac{1}{2} \times \frac{1}{8}$ angle iron, or of aluminum. Their spacing is such as to accept the wheels 29. The motor unit 30 is preferably mounted on the two bottom members of the triangles 31, and drives one of the wheels 29 with a chain. Any conventional motor and gear reducer unit which is suitable for outdoor service can be utilized. Preferably, the "front" wheel is driven, as shown in FIG. 7, as indicated by the arrow 20A indicating the direction of motion. This is thought to provide better tractive qualities.

FIG. 10 shows the control mechanism used to regulate the speed of each individual motor 30. As will be appreciated by those skilled in the art, each of the motors must operate at a slightly different rotational speed in order that the radial arm assembly 12 can rotate at a constant rate. Furthermore, some of the wheels will roll more freely than others due to friction in the drive train itself as well as to irregularities in the ground encountered, and other unpredictable variables, such that it would not be possible to set each of the motors to run at any steady speed, even if it were readily possible to calculate the ratios of the correct speeds of each of the motors. Accordingly, some form of regulating device, regulating the speed of each of the motors individually so that the total radial arm 12 remains in a relatively straight line, must be used.

FIG. 10 shows an analog feedback type speed regulator for controlling the speed of the motors 30. It will be apparent to those skilled in the art that while other arrangements could be devised, that shown in FIG. 10 has the significant advantage of simplicity, and has been shown to work relatively well. The control arrangement comprises a rheostat or potentiometer 70 mounted within a control box 72. The knob 74 of the potentiometer or rheostat has a string 76 wrapped around it which is connected to two tines of a bifurcated control member 78. The other end of the control member 78 comprises a V-shaped member, the two legs 80 of which are provided with insulated coatings 82, the control member 78 being formed of electrically conductive wire. The insulated legs 80 ride on either side of a wire 86 carrying a potential, typically 9 volts D.C. The wire 86 extends parallel to the main water pipe 32 and is maintained under tension, such that any deflections in the water pipe 32 caused by the motor's moving too fast or too slow will manifest themselves in a movement of the wire 86 with respect to the water pipe 32. The control member 78 is pivoted at a pivot point 88 such that deflection of the wire 86 with respect to the pipe 32 will cause the control member 78 to pivot about pivot point 88, thus turning the knob 74 on the potentiometer 70. Current is supplied to the potentiometer 70 by wire 2 connected to a junction box 94 to which is connected the main electrical power conduit 96, and is supplied to the motor 30 by further wires 90. Hence, deflection of the water pipe causes variation in the speed of the motor 30.

If the deflection of the pipe 32 should become extremely great, e.g. due to a motor stalling, an insurmountable obstacle in the path of a wheel, or the like, it is desirable that the entire system be shut down. Sensing of such condition is provided when the wire 84 touches a ground lead 98, which is bent as shown to ensure contact therebetween when the deflection reaches a predetermined maximum permitted amount.

Those skilled in the art will recognize that other control arrangements are possible. Rather than having the potentiometer deflection directly control the motor, it might be preferable to send the signal generated by rotation of the potentiometer responsive to deflection to a microprocessor for control of the wheel speed. Such a microprocessor could detect the wheel speed. Such a microprocessor could detect the relative amount of bending in the main water pipe and supply additional current to each of the individual motors as necessary, for example, to climb a hill or the like.

Other means of detection of deflection in the main water pipe 32 are additionally possible. For example, mirrors could be mounted on each of the towers. A laser with a coupled photodetector could be controlled to scan the array of mirrors from a point off the axis of the main water pipe 32, and could determine the deflection in the main water pipe 32 from the spacing in time of the reflected beams. Accordingly, a wide variety for means for ensuring that the radial arm 12 remains straight are deemed to be within the scope of the invention.

FIG. 11 shows a cross-sectional view of the center post 14 according to the invention. It will be understood that this device is required to provide an anchoring location for the center of the radial arm 12 and to provide electrical and water connections to the radial arm 12. Accordingly, it comprises a stout post 100 anchored by bolts 102 in a block 104 of concrete in the ground. A number of O-ring seals 106 provide a seal between a water pipe 108 which is buried within the ground, as noted above in connection with FIG. 1, and a rotating turret member 110. Electrical connection is made from a wire 112 supplying power as required to a plurality of slip rings 114 which are then connected by wires (not shown) to an electrical conduit 116 running along the radial arm 12 indicated generally by the main water pipe 32. Ball bearings 120 allow relatively frictionless radial movement of the rotating turret member 110 with respect to the post 100. As shown, the assembly of the ball bearings and of the slip rings is enclosed within a housing 122 which is fixed by way of bolts 124 and 126 to the upright tube 100. The upper portion 128 of the housing 122, of course, rotates with the radial arm 12. It is recognized that centralized post structures for dispensing water and electrical power to rotating irrigation systems are within the skill of the art, and any such improvements in the prior art are deemed to be within the scope of the invention disclosed herein.

Those skilled in the art will recognize as well that there are numerous additional improvements and modifications which can be made to the invention without departing from its essential spirit and scope, which is therefore not to be read as limited by the above exemplary disclosure, but only by the following claims.

What is claimed is:

1. A system for controlling the movement of animals in a pasture and for the irrigation of said pasture, said system comprising means for urging the animals to travel along a predetermined labyrinthine path defined by a stationary spiral electric fence at a predetermined rate, such that the herd grazes on every portion of the pasture in sequence over a given period of time, said means for urging further comprising means for irrigating substantially the entire pasture.

2. The system of claim 1, wherein said means for urging said animals to travel along the labyrinthine path comprises a moving electric fence.

3. The system of claim 2, wherein said moving electric fence is pivoted generally at the center of said spiral.

4. The system of claim 3, wherein said means for moving said cattle along said path comprises a rotatable arm comprising means for distributing water substantially uniformly along said arm.

5. A system for controlling the use and irrigation of a pasture, comprising a stationary fence means for defining a spiral labyrinthine path for animals whereby said animals graze essentially all of a circular portion of said pasture, and moving fence means for urging said animals along said labyrinthine path and for controllably irrigating said pasture.

6. The system of claim 5, wherein said means for urging said animals along said labyrinthine path is an electric fence movable along said path.

7. The system of claim 5, wherein said means for urging said animals along said path and said means for irrigating said pasture comprises an elongated water pipe, drip tray means connected to said water pipe for irrigating said pasture, said pipe and said drip tray means being supported by wheels above said pasture, and means for controlling the motion of said elongated pipe over said pasture, such that said pasture is uniformly used and irrigated.

8. The system of claim 7, wherein said water pipe is pivoted to rotate about an axis at the center of said spiral.

9. The system of claim 7, wherein said means for urging said animals along said path comprises electric fence means mounted for movement together with said elongated water pipe.

10. The system of claim 7, wherein said drip tray means for irrigating comprises a plurality of elongated water vessels having apertures therein for release of water, and means for controlling the pressure of said water in said vessels.

11. The system of claim 7, wherein said means for controlling the motion of said elongated pipe over said pasture comprises means for sensing deflection in said pipe and for correcting therefor.

12. An improved center post radial arm irrigation system, comprising a center post, an elongated radial arm adapted for rotation about said center post, a water pipe extending along said radial arm, said center post comprising means for supplying water to said water pipe, a plurality of drip trays each comprising an elongated water vessel hving orifices formed therein, and means for supply of water from said water pipe to said drip trays at a predetermined pressure, such that water trickles from said orifices in said drip trays onto the ground, said drip trays being suspended by flexible means from said water pipe, whereby said drip trays are self-leveling.

13. The apparatus of claim 12 wherein said drip trays comprise needle valve means for controlling the rate of trickling of said water onto the ground.

14. The apparatus of claim 12 wherein said drip trays are provided with open-ended tubes extending vertically upwardly from said vessels, to allow escape of air from the interior of said drip trays, and to provide regulation of water pressure within said trays.

15. The apparatus of claim 14 wherein said vertically extending tubes are transparent, to allow an operator to readily control the pressure in said drip trays.

16. The apparatus of claim 12, wherein said radial arm extends across a round field and a first portion of said radial arm is fitted with said drip trays for trickling of water onto the ground and with means for urging livestock along a predetermined path laid out in said field, and a second portion is provided with means for restraining said livestock from approaching behind said first portion.

17. The apparatus of claim 16, wherein said means for urging livestock along a predetermined path in said field is an electric fence carried by the portion of said radial arm which is fitted with means for trickling water onto the ground.

18. The apparatus of claim 16, wherein said predetermined path is defined by electric fence means on the ground.

19. The apparatus of claim 18, wherein said predetermined path is generally spiral.

20. An apparatus for grazing management, comprising a stationary electric fence on the ground and a movable electric fence for urging animals along a predetermined path defined by said stationary fence on the ground wherein said stationary fence on the ground defines a spiral path and said movable fence comprises a radial arm rotatable about the center of said spiral such that said animals are driven along said spiral from the inside to the outside or vice versa.

21. The apparatus of claim 20, wherein said radial arm further comprises means for irrigating.

22. The apparatus of claim 21, wherein said means for irrigating comprises means for supplying water to self-leveling drip trays carried by said radial arm, and means for regulating the rate at which water is dripped onto the earth from said drip trays.

23. The apparatus of claim 22, wherein said means for regulating the rate at which water is dripped onto the earth from said drip trays is needle valve means.

24. The apparatus of claim 20, comprising means for controlling the rate of motion of said movable fence.

25. The apparatus of claim 24, wherein said means for regulating the rate of motion of said movable fence comprises means for individually regulating the rate of motion of each of a plurality of continuously driven wheeled towers supporting said movable fence.

26. The apparatus of claim 25, wherein said means for regulating the rate of motion of each of said towers comprises analog feedback means for controlling the speed of motors driving each of said towers.

27. The apparatus of claim 26, wherein said feedback means comprises means for providing a control signal responsive to deviation of said radial arm from an essentially straight line.

* * * * *